Nov. 12, 1940. P. H. KEMMER 2,220,907
BALANCE WRAPPER FOR AILERONS
Filed Dec. 8, 1939

INVENTOR
PAUL H. KEMMER
ATTORNEYS

Patented Nov. 12, 1940

2,220,907

UNITED STATES PATENT OFFICE 2,220,907

BALANCE WRAPPER FOR AILERONS

Paul H. Kemmer, Fairfield, Ohio

Application December 8, 1939, Serial No. 308,233

6 Claims. (Cl. 244—90)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft and particularly to improvements in dynamically balanced aircraft control surfaces.

It often occurs that the balance of a control surface, as constructed, is not compatible with the aerodynamic, structural and vibration characteristics of the craft with which it is associated, thereby resulting in flutter and lack of stability of the control surface. This flutter and lack of stability sets up deleterious vibrations which cause failure or weaken the strength of the materials and shorten the life of the structure. It therefore becomes necessary to adjust for this lack of balance. Also, once the balance weight is installed, it is practically permanent and ordinarily cannot be changed without great difficulty. It is desirable, however, to be able to change the balance weights, both to improve the refinement of the balance as regards the distribution of the added weights and to change the balance in conformity with the aerodynamic, structural and vibration characteristics under all desired operating conditions of the airplane and motors.

To accomplish these objectives I have provided a novel balance weight wrapper which is simple, efficient, and free from the above objections. My invention consists essentially in providing a wrapper that is constructed of materials having an average density materially greater than that of the control surface at the point or points of attachment and yet capable of conforming to the contour of the control surface portion to which it is to be added.

Other advantages and objects of my invention will be readily apparent to those skilled in the art from the following description and accompanying drawing wherein like reference characters indicate like parts throughout the several views and wherein.

Figure 1:
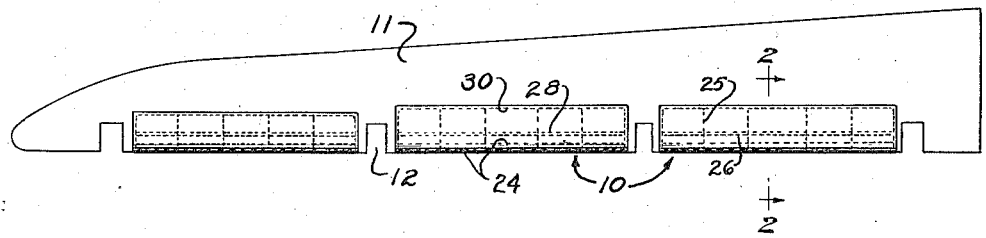
Fig. 1 is a plan view of an aircraft control surface illustrated with three distributed weights attached.

The device embodying my invention comprises a balance-weight-wrapper that is readily deformable for application to conform to the particular contour at the point of attachment of the airfoil to which it is to be attached. As illustrated in the drawing, a series of balance-weight-wrappers 10 are applied to the leading edge of a control surface 11 and arranged in spaced relation to one another and attached to those portions intermediate the notches 12 formed to receive the hinges (not shown) for the journals 13 of the control surfaces. The control surface is formed, as shown in Fig. 2, in the conventional manner, having the edge of the conventional rib or bulkhead 14 flanged as at 15 and a wood or metal "former" 16 to provide the smoothness of contour necessary for the curve at the leading edge portion.

Each of the wrappers are identical in construction and therefore a description of the construction of one will suffice for all.

Figure 2:
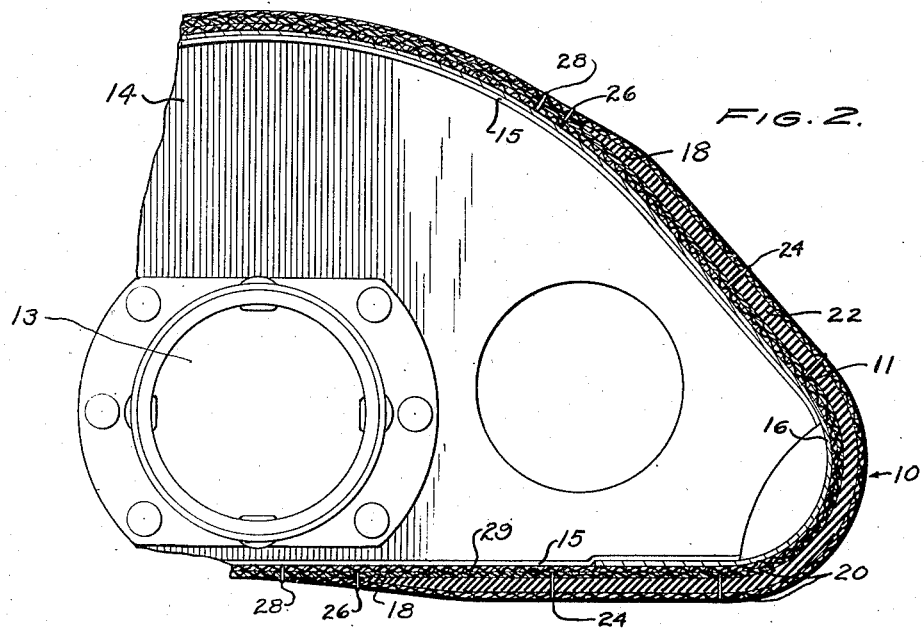
Fig. 2 is a section view, greatly enlarged, taken on the line 2—2 of Fig. 1.
Figure 3:
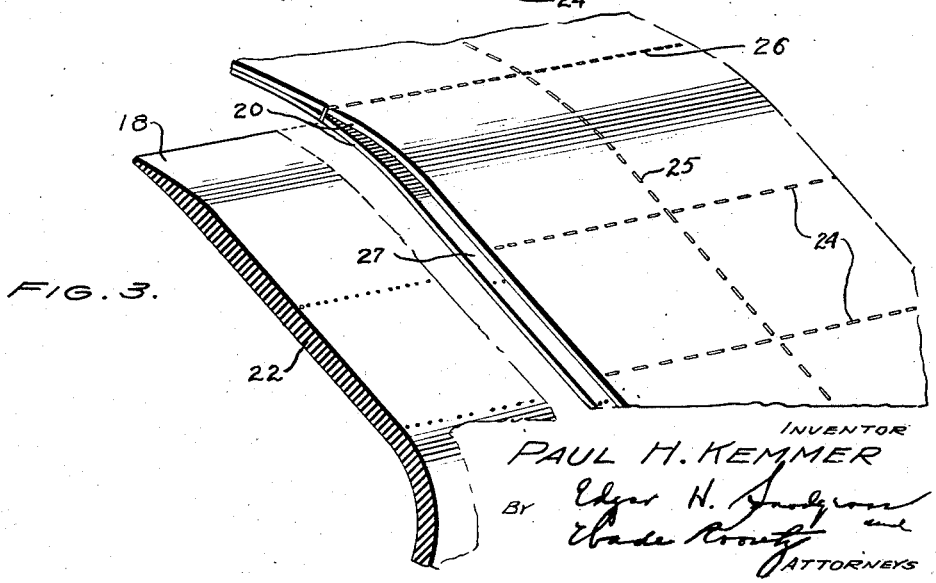
Fig. 3 is an exploded, fractional, perspective view of the fabric pocket and lead insert.

The balance-weight-wrapper, as shown in Figs. 2 and 3, is preferably in the form of a laminated structure having a central portion substantially throughout the length of the wrapper of substantially uniform thickness and feathered or tapered longitudinal edge portions 18 substantially throughout the length thereof. Thus, when the wrapper 10 is applied to the control surface it will present a minimum modification of the streamline form of the airfoil. If desired, the wrapper may be formed such that the wall thickness is a maximum along the central longitudinal portion thereof corresponding to the leading edge of the airfoil and tapering in thickness from the central portion towards those edges of the sheet that correspond to points behind the leading edge of the control surface.

The laminated structure, as shown in Fig. 3, is preferably constructed by uniting an upper and a lower sheet of flexible material 20 such as fabric, rubber or the like and an intermediate sheet 22 of readily flexible and deformable material of relatively high density such as lead or lead base alloy. The upper and lower sheets 20, as illustrated, are preferably made from fabric material. These sheets are united by spaced rows of stitching 26, forming an opening or pocket 27 for receiving the lead sheet 22. This pocket may be made of such dimension that when the lead sheet is inserted the fabric material will be placed under tension so that when the wrapper has been secured to the control surface, the lead sheet will be held firmly in place. More positive unification of the lead and fabric sheets may be accomplished if desired, as shown, by sewing through the lead sheet, the stitching 24 extending longitudinally of the wrapper and the stitching 25 transversely of the wrapper.

The edge portions of one or both of the fabric layers preferably extend a substantial distance beyond the edge portion of the lead sheet and are suitably connected together as by means of cement or dope, or stitching, or both to provide extension flaps which, when the wrapper is applied to the control surface or airfoil, serve to distribute the load forces of the mass over a greater area of the control surface or airfoil surface, thus in effect, reducing stress concentration. The edges of the wrapper are tapered by skiving the outer sheet 20 at the junction of its edge with the inner sheet 20 after the same have been secured together in a homogeneous condition by means of dope or cement.

The wrapper is applied to the airfoil surface by folding the same over the contour of the airfoil or control surface, as shown in Fig. 2, and uniting the wrapper to the outer surface of the airfoil in any suitable manner such as by cementing or doping the same thereto or by means of stitching or both. This is preferably accomplished in the case of a fabric covered airfoil, by first cementing the wrapper to the outer surface of the airfoil cover 29 and then stitching through the wrapper and airfoil cover as at 28.

It will be obvious that the wrapper may be in the form of a patch comprising a supporting outer sheet of flexible material, either fabric or a composite of fabric and rubber and an inner sheet of lead material centrally disposed and united with said outer sheet. If desired, the outer sheet, when made of rubber may be molded into a substantially U-shape to conform to substantially the shape of the airfoil at the point of attachment and be provided with a recess to receive the lead sheet, the bight of the U-shape cover having maximum wall thickness and the legs having gradually outwardly or rearwardly tapering wall thickness. The outer sheet has its edge portions extending sufficiently beyond the peripheral edge of the lead sheet to completely enclose the lead sheet when applied to the airfoil or control surface and to provide sufficient contacting area with the surface of the airfoil or control surface to firmly support the lead sheet against the airfoil surface and minimize the stress concentration.

I claim:

1. A balance-weight-wrapper in the form of a laminated structure adapted to conform to the leading edge portion of an airfoil for purposes of balancing the same comprising two layers of flexible material united to provide a pocket and a marginal attachment, and a layer of flexible metal material of relatively high density received in said pocket in close fitting relation with the inner surfaces of said pocket.

2. A balance-weight-wrapper in the form of a laminated structure adapted to conform to the leading edge portion of an aircraft control surface for purposes of balancing the same comprising two sheets of flexible material united to provide a pocket, a sheet of readily deformable metal material disposed between said first two mentioned sheets of material and within said pocket, said sheet of metal having feathered longitudinal edge portions to provide the wrapper with a gradually varying wall thickness in the direction of the chord of said control surface.

3. A balance-weight-wrapper in the form of a laminated structure adapted to conform to the leading edge portion of an aircraft control surface for purposes of balancing the same comprising two sheets of flexible material united to provide a pocket, and a layer of flexible metal material of relatively high density received in said pocket in close fitting relation with the inner surfaces thereof, said pocket having a space when in the unstrained position of the upper and lower layers less than the space occupied by said layer of heavier material.

4. A balance-weight wrapper in the form of a laminated structure adapted to conform to the leading edge portion of an airfoil surface for purposes of balancing the same comprising a layer of flexible metal material of relatively high density and a cover layer of flexible material superimposed upon and united with said first mentioned layer, at least one of said layers having tapering edges to provide a laminated structure of gradually increasing wall thickness from the edges toward the center thereof and said cover layer having its edge portions extending beyond the edge portion of said metal layer to provide an attachment for said wrapper when applied to said airfoil.

5. An aircraft airfoil having a balance-weight-wrapper conforming to and connected with the outer surface of said airfoil, said wrapper being provided with tapering edges to provide therewith a substantially streamlined contour.

6. An aircraft airfoil having a plurality of spaced balance-weight-wrappers conforming to and connected with the outer surface of said airfoil, each wrapper being provided with tapering edges to provide therewith a substantially streamlined contour.

PAUL H. KEMMER.